Jan. 5, 1954
G. F. SARAZIN
2,664,763
VIBRATION DAMPER
Filed March 29, 1950
5 Sheets-Sheet 1
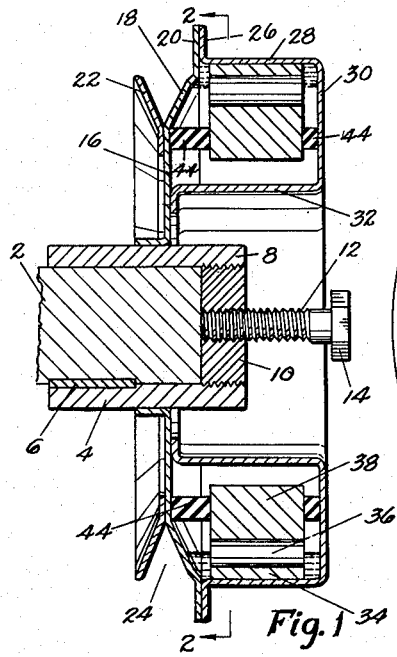
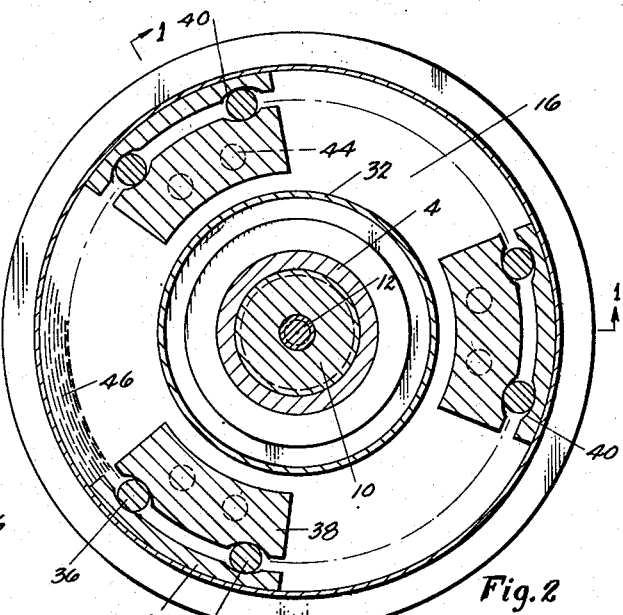
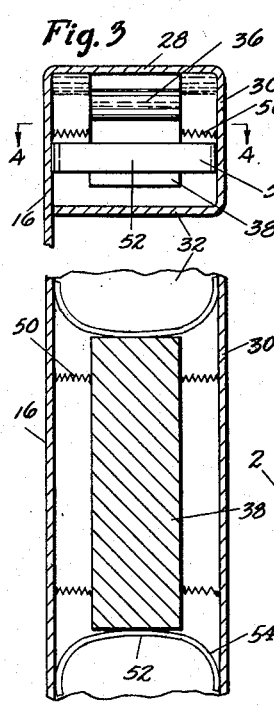
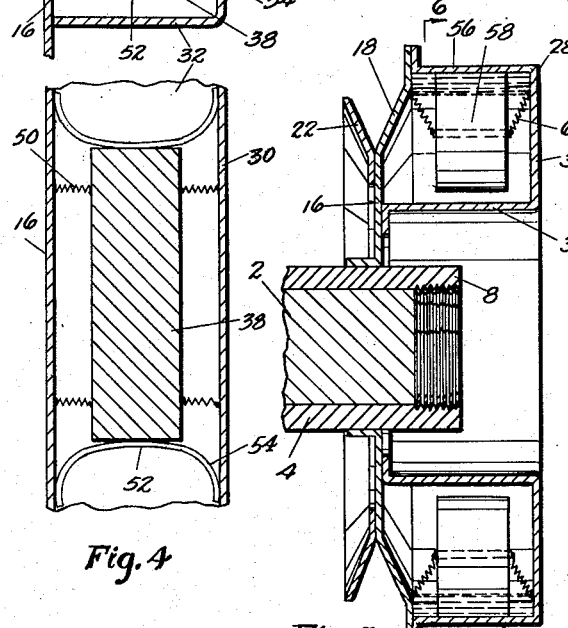
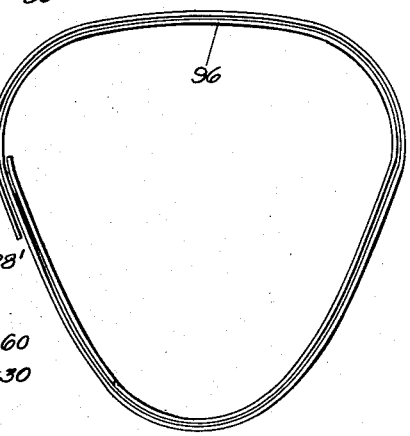
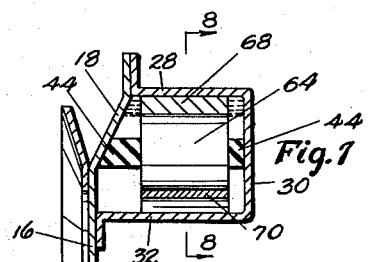
INVENTOR.
Gilles F. Sarazin
BY
Bailey, Stephens & Huettig
ATTORNEYS Jan. 5, 1954 G. F. SARAZIN 2,664,763
VIBRATION DAMPER
Filed March 29, 1950 5 Sheets-Sheet 2

INVENTOR.
Gilles F. Sarazin
BY
Bailey, Stephens & Huttig
ATTORNEYS

Jan. 5, 1954  G. F. SARAZIN  2,664,763
VIBRATION DAMPER
Filed March 29, 1950  5 Sheets-Sheet 3

INVENTOR.
Gilles F. Sarazin
BY
Bailey, Stephens & Huettig
ATTORNEYS

Jan. 5, 1954 — G. F. SARAZIN — 2,664,763
VIBRATION DAMPER
Filed March 29, 1950 — 5 Sheets-Sheet 4
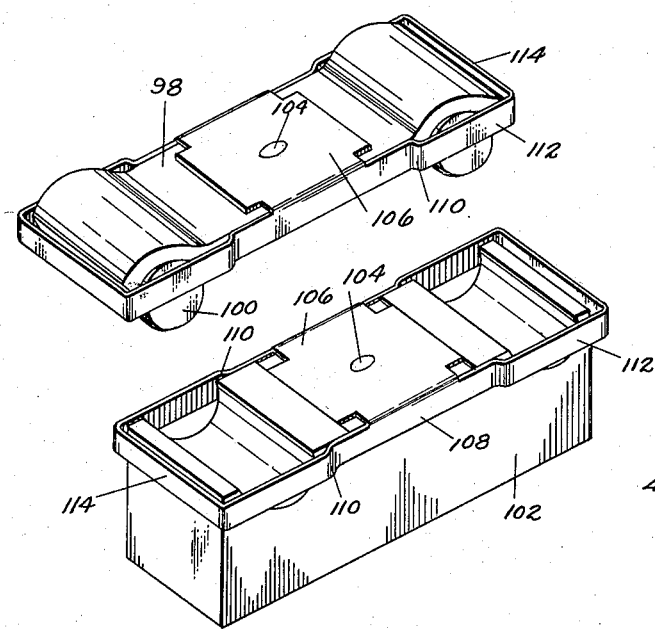
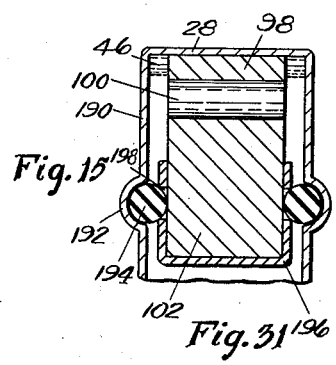
Fig. 15
Fig. 31
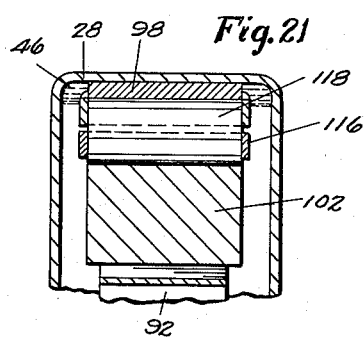
Fig. 21
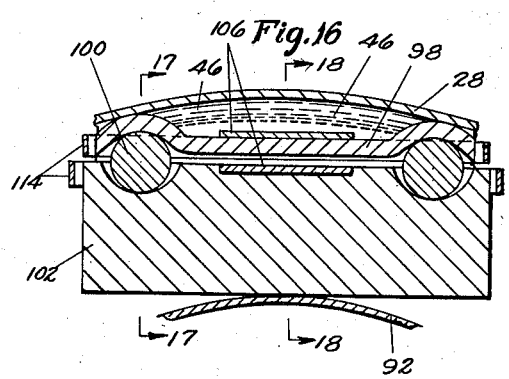
Fig. 16
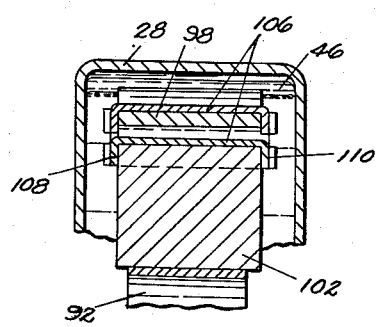
Fig. 18
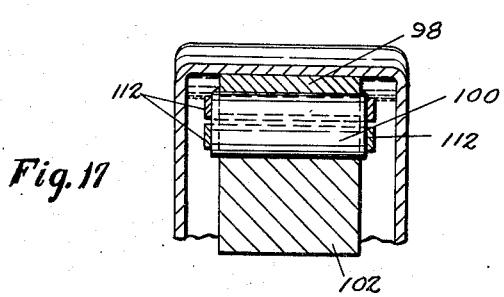
Fig. 17
INVENTOR.
Gilles F. Sarazin
BY
Bailey, Stephens & Huettig
ATTORNEYS

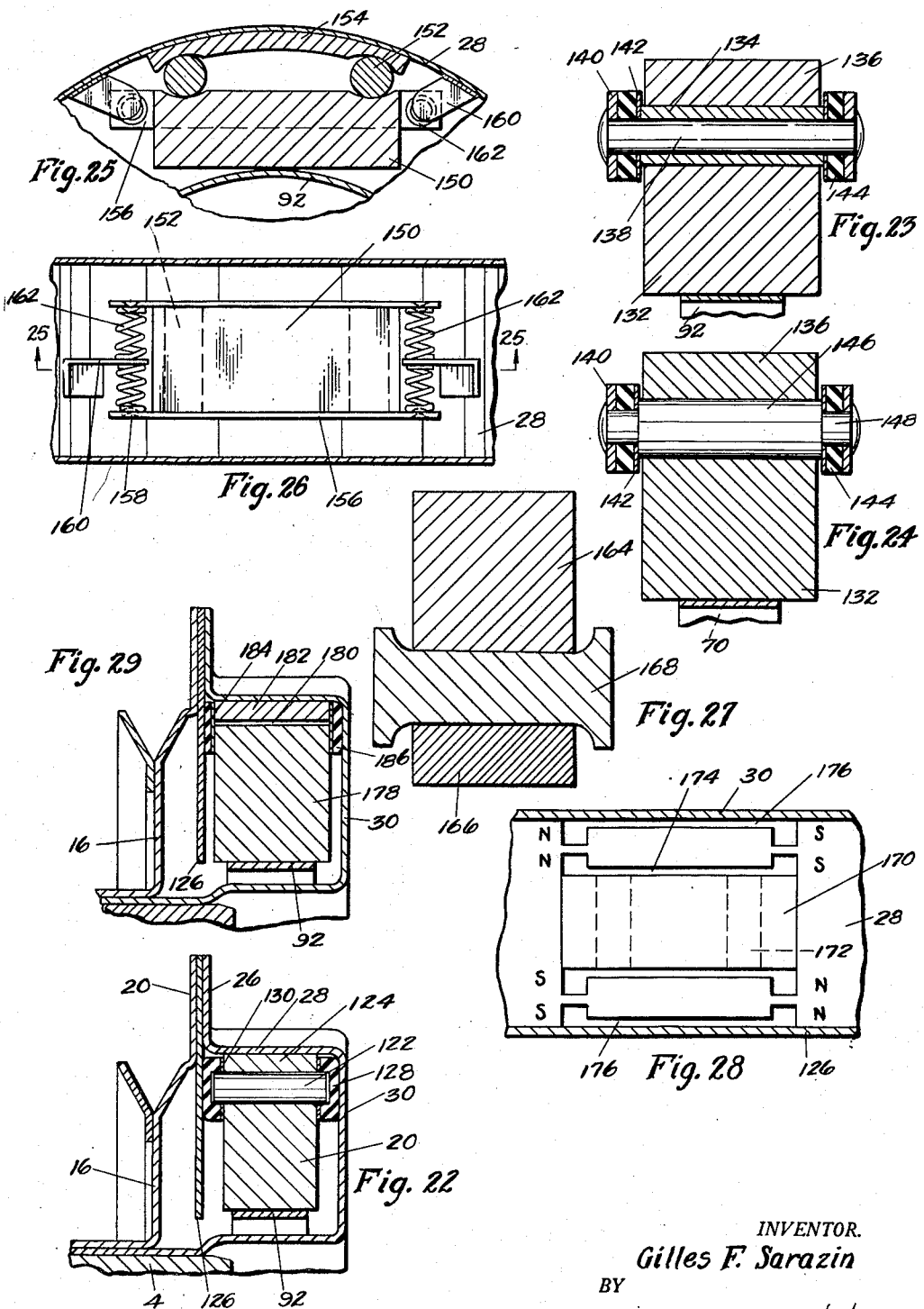

Patented Jan. 5, 1954

2,664,763

UNITED STATES PATENT OFFICE 2,664,763

VIBRATION DAMPER

Gilles François Sarazin, Paris, France

Application March 29, 1950, Serial No. 152,686

13 Claims. (Cl. 74—574)

The invention relates to vibration dampers, and more especially to dampers for reducing the torsional vibrations of rotating shafts.

The primary object of the invention is to provide a vibration damper of high efficiency which is sufficiently inexpensive in construction to be of general utility in fields where high production and low cost are essential.

A further object of the invention is to provide such a damper which operates quietly and does not appreciably wear out, even over long periods of use.

Another object of the invention is to provide a damper in which some movement of the damping weight is permitted in directions in which movement is undesirable, and means are provided for applying a restoring force, these means being so constructed as to offer substantially less resistance to movement of the weight circumferentially of the shaft, this constituting the movement which damps the vibrations, than conventional suspensions.

In one aspect of the invention, these restoring-force supplying means limit movement radially of the shaft, so that the weights do not fall in towards the shaft when it is not rotating. This prevents the weights from leaving their proper relationship with the tracks which guide their movement, and also avoids noisiness during starting and stopping.

More particularly, in this aspect, the invention contemplates, in a damper using a plurality of weights distributed around the shaft, the use of a common member operating on all the weights for holding them radially outward, this member being preferably freely mounted and floating with respect to the shaft. One specific form of member is a closed ring of resilient metal, such as a strip of spring steel bent to form a ring.

In prior art devices, arrangements have been provided for preventing shifting of the weights and rollers with respect to the tracks longitudinally of the shaft. When there is any tendency to such movement, these arrangements create substantial friction which disturbs the operation of the damper.

In another aspect, the present invention allows some movement of the damping masses longitudinally of the shaft, but provides means to supply a restoring force acting longitudinally of the shaft, so as to move the member back to its proper position if it moves under the influence of forces tending to produce rocking of the member. In some types of engines, the end of the shaft, where it is most convenient to mount the damper, has a decided whip, which tends to cause rocking of the weights, or movement longitudinally of the shaft. The present invention provides an arrangement which offers a substantial restoring force opposing such movement, while offering substantially less resistance to damping movement of the weights circumferentially of the shaft. Thus the interference with the proper damping movement is substantially reduced as compared with that inherent in the known types of dampers.

More particularly, in connection with masses which are mounted in a bifilar suspension, by means of rollers engaged between tracks on the weights and other tracks connected to the shaft to rotate therewith, the invention provides an arrangement for supplying restoring forces opposing movements longitudinally of the shaft of the rollers, and of the weights with respect to the rollers. With this arrangement there is preferably combined another arrangement for resiliently resisting radial movement of the weights inwardly towards the shaft axis.

Another object of the invention is to provide, in combination with these features, an arrangement of simple nature for lubricating the movement of the weights, without offering any substantial fluid damping action to such movement.

Still another object of the invention is to provide a construction which allows ready removal of the damper from the end of a shaft, without danger of damage to the damper structure or to the shaft. Since the damper, to reduce the expense of manufacture, is made for the most part of fairly thin sheet metal, it cannot be readily removed from the shaft by ordinary tools. The invention therefore provides a special structure of the sleeve portion which engages the shaft and a special tool for acting in conjunction with this sleeve portion, such that it is easy to remove the damper without injury to the sheet metal parts.

Further objects and advantages of the invention will appear more fully from the following description, especially when taken in conjunction with the accompanying drawings which form a part thereof.

In the drawings:

Fig. 1 is a cross-section, substantially on the line 1—1 of Fig. 2, of a damper embodying my invention;

Fig. 2 is a cross-section on the line 2—2 of Fig. 1;

Fig. 3 is a cross-section through a part of a modified form of damper;

Fig. 4 is a cross-section on the line 4—4 of Fig. 3;

Fig. 5 is a cross-section through still another form;

Fig. 7 is a cross-section, on the line 7—7 of Fig. 8, of another modification;

Fig. 14 shows a modified form of spring usable in connection with the device of Fig. 12;

Fig. 15 shows in perspective the two parts of still a further form of damper mechanism;

Fig. 16 is a cross-section through the mechanism of Fig. 15 in assembled relation;

Figure 30:
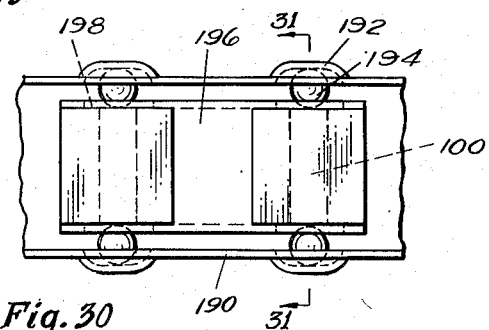
Figure 19:
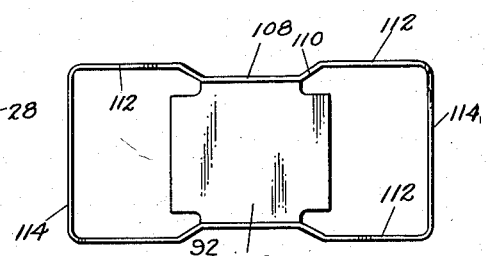
Figure 20:
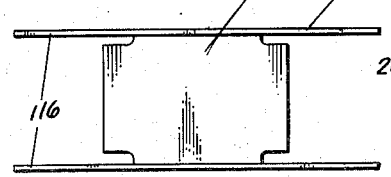
Figure 32:
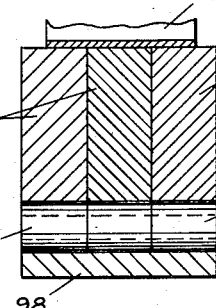

Figs. 17 and 18 are cross-sections on the lines 17—17 and 18—18 respectively of Fig. 16;

Fig. 19 shows in plan view one of the spring elements of this arrangement;

Fig. 20 is a similar view of a modified form of spring arrangement;

Fig. 21 is a cross-section through a damper using the spring arrangement of Fig. 20;

Figs. 22 to 24 are cross-sections through still other forms of damper;

Fig. 25 is a cross-section through another form, substantially on the line 25—25 of Fig. 26;

Fig. 26 is a bottom plan view of the damper of Fig. 25;

Fig. 27 is a cross-section through still a further modification;

Fig. 28 shows, in bottom plan view, another form of damper;

Fig. 29 is a cross-section through still another form;

Fig. 30 is a plan view of a modified form;

Fig. 31 is a section on the line 31—31 of Fig. 30;

Fig. 32 is a section of another modification.

In the drawings, the damper shown is intended to be applied to a shaft 2, which may be for example the crankshaft of an engine and which is mounted to rotate. The damper includes a sleeve 4 adapted to slide onto one end of the shaft 2 and secured against rotation thereon by a key 6. Sleeve 4 has an extension 8, which, when the damper is assembled on the crankshaft with its damping masses in the proper relationship thereto longitudinally of the shaft, extends beyond the end of the shaft. This extension is internally threaded and is adapted to receive an externally threaded plug 10 which is provided with an internally threaded central opening adapted to receive a threaded bolt 12 having preferably a polygonal head 14.

With this arrangement, the plug 10 and bolt 12 form a tool for removing the damper from the shaft. Since, as will be pointed out below, the main portion of the damper is formed of sheet metal, it is difficult to obtain a proper engagement for removing it from the shaft if repairs or substitution of a new damper are necessary. To avoid this difficulty, plug 10 is screwed into extension 8 and bolt 12 is screwed into plug 10. By turning head 14, bolt 12 pushes against the end of the shaft 2 and thus pulls the sleeve 4 away from the shaft until the whole damper can be readily removed.

In the forms shown, the damper is ordinarily enclosed in a casing. Sleeve 4 carries an outwardly extending disc 16, preferably of sheet metal, which has an angularly bent part 18 and a top flange 20. A part 22 angularly bent in the other direction is welded to disc 16, so as to form a groove 24 for receiving the fan belt. A second piece has a part 26 welded to flange 20, an outer cylindrical portion 28, a side wall 30 and an inner cylindrical portion 32 having a flange 34 welded on disc 16. There is thus formed an annular enclosed chamber in which, as will be described below, the damping mechanism is arranged.

In Figs. 1 and 2, there are shown dampers mounted in a bifilar manner. Three of these are provided equally distributed around the shaft 2. Each damper includes a block 35 mounted on the inside of wall 28, a pair of rollers 36 and a damping mass or pendulum 38. The pendulum 38 and the block 34 are provided with tracks 40 engaging the rollers, these tracks having a greater diameter than the rollers, in a manner known in the art.

There is a tendency for the pendulums to rock with respect to the rollers and blocks if there is any whip in the shaft. To prevent this, means are provided which resiliently resist rocking or longitudinal movement of the pendulums and apply a restoring force opposing such movement while offering substantially less resistance to damping movement of the pendulums around the shaft axis, or circumferentially. In the form shown in Figs. 1 and 2, this means includes rubber plugs 44 mounted on the side walls 16 and 30 of the annular casing, and engaging the pendulums. The pendulums are free to slide between these blocks, and this freedom is accentuated by the fact that, as will be explained below, the closed annular casing also contains a lubricant in a quantity which, under normal conditions, engages the surfaces of the blocks sufficiently often to keep these surfaces lubricated. In addition, the rubber members 44 are flexible, and therefore can bend to some extent when there is a tendency for the pendulums to oscillate circumferentially of the shaft under the influence of disturbing vibrations.

Within the enclosed annular casing is contained a body of oil or other suitable lubricant 46. The amount of this oil is such that, when the shaft rotates, the oil under the centrifugal force of rotation forms a layer in the outer part of the closed casing of such thickness as substantially to cover the blocks 34 and their tracks, without however covering any substantial part of the pendular masses 38. Thus this oil serves for the continuous lubrication of the rollers 36, without offering any substantial resistance to the movement of the masses 38 which thereby oscillate as free pendulums without substantial damping friction.

In the form of the invention shown in Figs. 3 and 4, another arrangement for offering substantial resistance to rocking of the pendulum without substantially preventing its oscillatory movement is shown. In this form, the mass 38 is connected to the walls 16 and 30 by coil tension springs 50 spot welded at their ends to the casing walls and to the pendulums. There may also be provided members formed of thin strip spring metal having central portions 52 welded to the ends of masses 38, and having free backwardly bent end portions 54 engaging the walls 16 and 30. These means may be used either separately or together. Each of them has the effect of offering a substantial resistance to rocking of the mass 38 longitudinally of the axis, while offering a substantially less resistance to its damping movement circumferentially.

Figure 6:
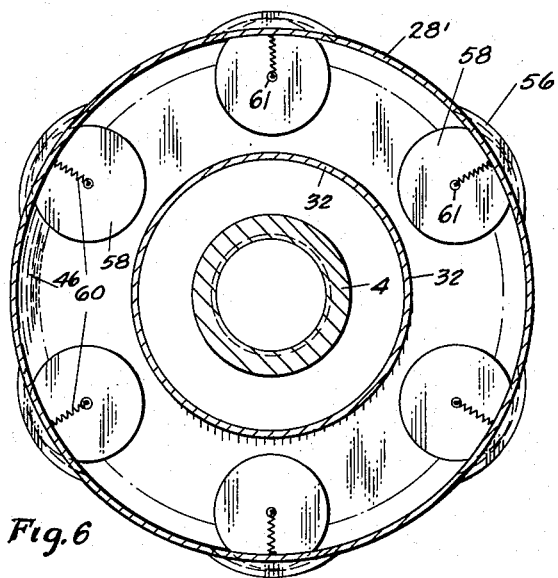
Fig. 6 is a cross-section on the line 6—6 of Fig. 5.

In Figs. 5 and 6, still another modification is shown. This utilizes a monofilar type of pendulum composed of a single rolling mass. Six of these are equally distributed around the shaft axis. In this form, the outer wall 28' of the closed chamber has a series of depressions 56 formed therein, within which engage the weights 58 in the form of simple round plugs. Coil springs 60 are welded at their ends to pins 61 turnable in the centers of these plugs 58 and to the walls 18 and 30 at points adjacent the outer edges of these walls. The springs 60 serve, first, to resist rocking of the plugs 58 if the shaft whips; and, second, to resist inward movement of the plugs when the shaft is not rotating so that the weights do not fall out of position and cause rattling. The springs offer greater resistance to movement inwardly toward the shaft axis and to rocking movement longitudinally of the shaft than they do to any movement circumferentially, this being the damping movement.

Figure 8:
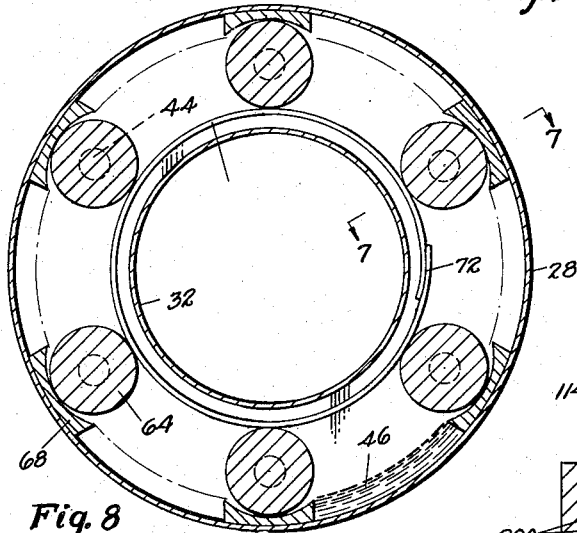
Fig. 8 is a cross-section on the line 8—8 of Fig. 7.

In the form of Figs. 7 and 8 there are shown monofilar rolling members 64 engaging blocks 68 secured at spaced intervals around the inside of wall 28. Blocks 68 have tracks engaging rollers 64, the radii of curvature of which are greater than the radii of curvature of rollers 64. Inside the rollers 64 is a circular ring 70 of spring sheet metal having its ends overlapped and preferably welded together as at 72. This spring member fits against the inner sides of rollers 64. The purpose of this member is substantially to prevent movement of the members 64 inwardly radially of the shaft when the engine stops, and it will be apparent that the resilient resistance offered to such movement is considerably greater than the resistance offered to the damping movement circumferentially of the shaft. In addition, to prevent rocking of the blocks 64 longitudinally of the shaft, I provide rubber members 44 secured to the walls 18 and 30, and slidably engaging the side faces of the rollers 64.

Figure 9:
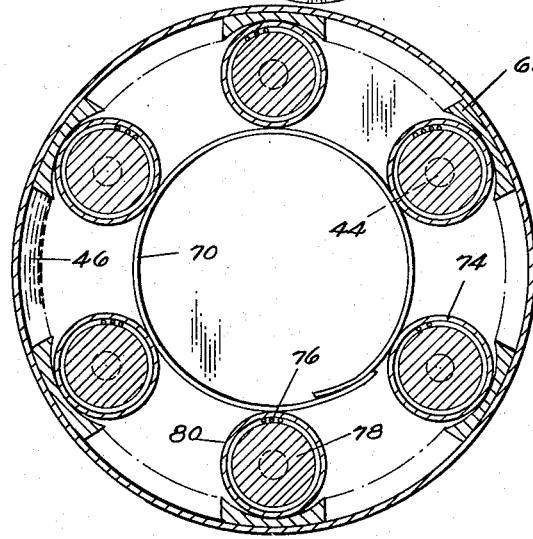
Fig. 9 is a cross-section through still a further modification of the invention.

Fig. 9 shows still a further modification in which most of the polar inertia involved in the ordinary single roller type of damper is eliminated. In this form, the tracks in blocks 68 are engaged by rings 74 forming outer races for needle bearings 76 which, in turn, support the main damping masses 78. When the shaft is subjected to torsional vibrations, masses 78 can move in curved paths without turning about their own axes, this movement being permitted by needle bearings 76, and only the rings 74, which have a relatively small polar inertia, being forced to turn.

Figure 11:
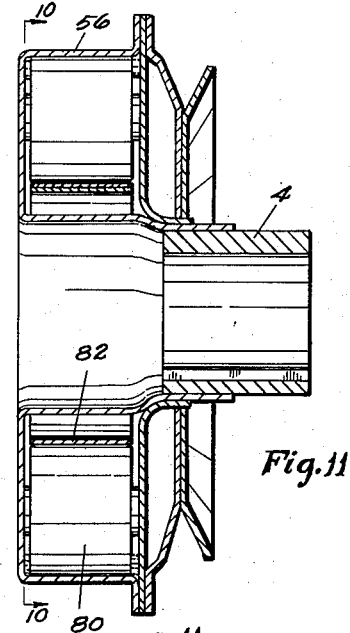
Fig. 11 is a cross-section on the line 11—11 of Fig. 10.
Figure 10:
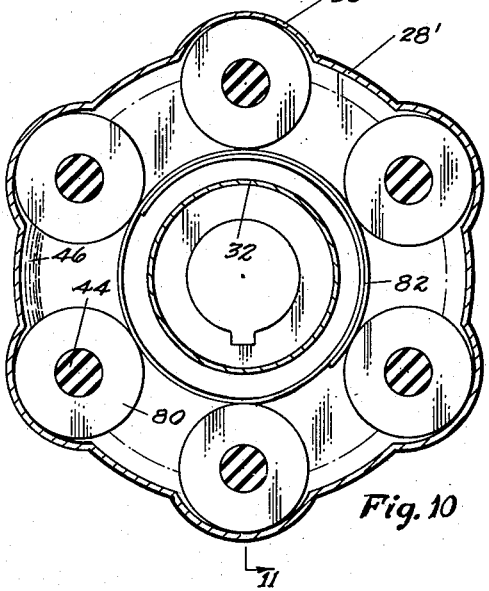
Fig. 10 is a cross-section through another modification, substantially on the line 10—10 of Fig. 11.

The form shown in Figs. 10 and 11 is in many respects similar to that of Fig. 8. In this case, however, the tracks 56 are formed, as in Fig. 6, in the outer casing wall 28'. Weights 80 in the form of discs move on these tracks, and are provided with rubber blocks 44. The spring 82 which is provided for holding these masses in position when the shaft is not in rotation is in the form of a strip bent into a circle with a substantial overlap, for example as much as half a revolution.

The ends of the spring in this form are not secured to one another.

Figure 12:
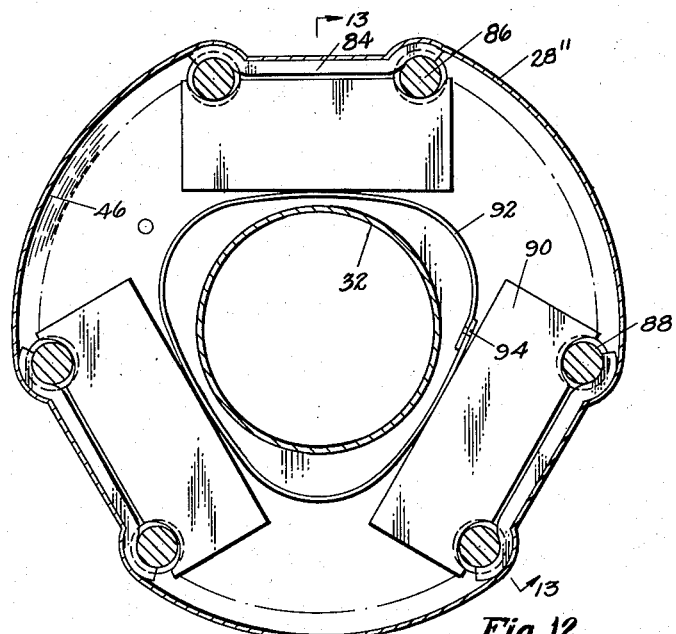
Fig. 12 shows in cross-section a further modification, substantially on the line 12—12 of Fig. 13.
Figure 13:
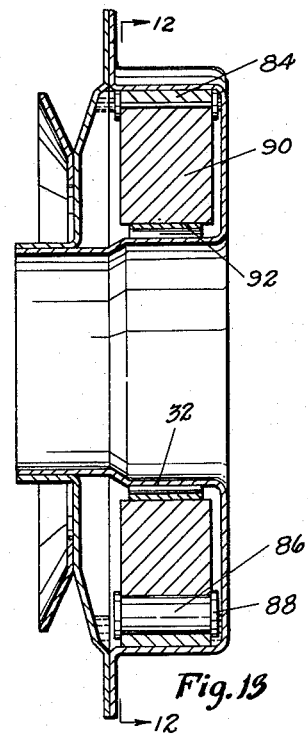
Fig. 13 is a cross-section on the line 13—13 of Fig. 12.

Figs. 12 and 13 show a bifilar suspension using a similar type of spring. In this form, blocks 84, provided with suitable shaped tracks, support, through rollers 86 having flanges 88, damping pendulum masses 90. The outer wall 28" is shaped to fit the blocks 84 as shown. A spring 92 of round coil shape, but compressed between the masses into a generally polygonal ring form, having its ends secured together as at 94, engages the sides of blocks 90 nearest the axis and holds the masses in position when the shaft is not rotating.

Fig. 14 shows, in the compressed form which it takes within the assembly, another form of spring which can be used in conjunction with masses such as shown in Fig. 12. In this, the spring 96 is formed of two or more convolutions, the ends being unsecured.

Figs. 15 to 20 show still another form of damper. In these, there is a block 98 secured on the inner face of wall 28, having tracks engaging rollers 100 which in turn engage tracks in the pendular mass 102. A spring 92 resiliently resists inward radial movement of the pendular masses. Secured as by riveting at 104 on the block and on the pendulum are plates 106 (see Fig. 19). Each of these plates has upwardly bent flanges 108 extending parallel to each other along two edges, these flanges extending beyond the plates and having outwardly bent portions 110 and parallel portions 112 forming legs, the ends of which are connected by cross pieces 114. The distance between legs 112 is equal to the length of rollers 100, and is greater than the width of block 98 and mass 102. The two plates are formed of suitable resilient material such as spring steel.

With this arrangement if there is any tendency for the pendular masses 102 to rock or to shift longitudinally of the shaft, such movement is permitted but an opposing restoring force is applied by the spring legs 112, since any movement of the masses with respect to the roller would act to distort the legs of the plates attached to the masses, while movement of the roller with respect to the guide blocks 98 would similarly distort the legs of the plates attached to the blocks. On the other hand, these springs offer only a slight resistance to the movement of the pendular masses circumferentially of the shaft, and therefore do not interfere with the proper damping action.

A somewhat similar form is shown in Figs. 20 and 21. In this case, plate 106 has legs 116 extending therefrom, these legs however being spaced apart merely by the width of the plate. In this form the roller 118 is of the same width as the block 98 and pendular mass 92. The member is formed of a resilient material, such as spring steel, and supplies an opposing restoring force to shifting of the pendular masses 102 longitudinally of the shaft while offering a much smaller resistance to such movement circumferentially of the shaft.

In the modification of Fig. 22, weights 120, mounted in a bifilar manner as in Fig. 2, move by rollers 122 on tracks 124. Between flanges 20 and 26 is arranged an annular plate 126 parallel to wall 30. On the ends of the rollers are round cups 128 of synthetic rubber or other suitable resilient material, with metal washers 130 on the inner faces abutting the sides of the weight and track. The openings in the cups are preferably slightly deeper than the projections of the rollers beyond the sides of the track and weight, so that when the rollers are centered their ends do not rest against the rubber of the cups. Any tendency of the weight to shift axially of the shaft is resisted by the rubber cups, which, however, offer comparatively little resistance to movement circumferentially of the shaft.

Fig. 23 shows an arrangement in which weight 132 engages sleeves 134 guided on track 136. Through the sleeves extend pins 138 riveted at their ends over an assembly composed of metal washers 140, 142 and a resilient washer 144. The assembly constitutes one of the guiding rollers and at the same time washers 144 supply the restoring force.

In Fig. 24, rollers 146 are used formed in one piece and having reduced end portions 148 for the washers.

In Figs. 25 and 26, weight 150 is guided by rollers 152 on track 154. The weight has welded to it side plates 156 extending beyond its ends and provided with inward protuberances 158. Welded on the wall 28 are brackets 160 located between the side plate extensions, and coil springs 162 centered on protuberances 158 are positioned between these brackets and the side plate extensions. These springs exert the required restoring force.

Fig. 27 shows an arrangement in which the restoring force is supplied by the shaping of the rollers and tracks. Weight 164 and track 166 are oppositely curved in cross-section in a plane radial to the shaft axis, and rollers 168 are correspondingly shaped, in hour-glass fashion. If the weight should shift longitudinally of the shaft (transversely in Fig. 27), the shape of the curves will exert a centering force and will bring it back to the correct position shown in the drawing.

In Fig. 28, weight 170 guided on rollers 172 carries magnets 174 opposite but slightly spaced from magnets 176 carried by wall 30 and plate 126 (see Fig. 22). The magnets are arranged with similar poles opposite each other, so that the fixed magnets exert on the weight restoring forces opposing its movement laterally to its damping motion.

In Fig. 29, weight 178 is guided by rollers 180 on track 182. Between the assembly and walls 30, 126 are arranged an annular steel ring 184 and resilient material 186 to supply the restoring force.

In the form of Figs. 30 and 31, shell 28 carries a block 98 with two concave tracks guiding rollers 100 which in turn guide pendular mass 102. Side walls 190 of the shell have circumferentially directed grooves 192 pressed out therefrom, in which engage balls 194 of synthetic rubber or other suitable elastic material. Pendulum 102 has secured on its inner surface, as by welding, a sheet metal member 196 of channel shape. The legs of this member overlie the sides of the pendulum and are provided with elongated slots 198 in which the balls 194 engage.

Balls 194 thus resiliently resist movement of the pendulum either longitudinally or radially of the shaft, while, by rolling in the grooves and slots, they offer much lower resistance to circumferential movement.

It has been found advantageous under some conditions to form the pendulum and rollers of a plurality of separate parts. Fig. 32 shows three pendular masses 200 and three roller sections 202 guided in track 98. This arrangement reduces the "detuning" of the pendulum which is likely to take place if the shaft bends or whips under the influence of vibrations.

In all the forms shown herein, I prefer to have the blocks, rollers, pendular masses and springs arranged in an enclosed envelope which contains the lubricant 46 in sufficient amount to cover the tracks in the guide block at least partially when the body is in rotation, but insufficient to cover any substantial portion of the pendular masses and therefore offering at most a negligible resistance to the movement of such masses.

While I have described herein some embodiments of my invention, I wish it to be understood that I do not intend to limit myself thereby except within the scope of the claims hereto or hereinafter appended.

I claim:

1. A vibration damper for a rotating shaft comprising a member secured to the shaft for rotation therewith, a plurality of weights, said member having a plurality of guide sections evenly distributed around the shaft axis and each including at least one arcuate track having its concavity directed toward the shaft axis, a corresponding number of weights rollingly guided on said tracks, and a floating spring member engaging the sides of said weights nearest the shaft axis.

2. A vibration damper for rotating shaft comprising a member secured to the shaft for rotation therewith, a plurality of weights, said member having a plurality of guide sections evenly distributed around the shaft axis and each including at least one arcuate track having its concavity directed toward the shaft axis, a corresponding number of weights rollingly guided on said tracks, and a floating spring member engaging the sides of said weights nearest the shaft axis, said spring member resiliently resisting movement of said weights circumferentially and radially of the shaft, said spring member offering substantially less resistance to movement circumferentially of the shaft than to movement radially of the shaft.

3. A vibration damper for a rotating shaft comprising a member secured to the shaft for rotation therewith, a plurality of weights, said member having a plurality of guide sections evenly distributed around the shaft axis and each including at least one arcuate track having its concavity directed toward the shaft axis, a corresponding number of weights rollingly guided on said tracks, and a flat spring in the form of a closed floating ring engaging the sides of said weights nearest the shaft axis.

4. In a damper as claimed in claim 3, a closed envelope rigid with said member and enclosing said tracks, weights and spring, and a quantity of lubricant within said envelope sufficient, when the shaft rotates, to cover said tracks but insufficient to cover said weights.

5. A vibration damper for a rotating shaft comprising a member secured to said shaft for rotation therewith, a weight, means operatively connecting said weight with said member and weight having opposed sets of arcuate tracks therein, rollers engaged in said tracks to guide said weight for movement with respect to said member in a plane transverse to the shaft axis, said rollers guiding said weight so that its center of gravity moves in a curve eccentric to the shaft axis under the influence of torsional vibrations of the shaft, spring means carried by said member resiliently resisting movement of said rollers longitudinally of the shaft, and spring means carried by said weight resiliently resisting movement of the weight with respect to the rollers longitudinally of the shaft.

6. A vibration damper for a rotating shaft comprising a member secured to said shaft for rotation therewith, a weight, means operatively connecting said weight with said member, said member and weight having opposed sets of arcuate tracks therein, rollers engaged in said tracks to guide said weight for movement with respect to said member in a plane transverse to the shaft axis, said rollers guiding said weight so that its center of gravity moves in a curve eccentric to the shaft axis under the influence of torsional vibrations of the shaft, spring means carried by said member engaging the ends of the rollers for resiliently resisting movement of said rollers longitudinally of the shaft, and spring means carried by said weight engaging the ends of said rollers for resiliently resisting movement of the weight with respect to the rollers longitudinally of the shaft.

7. A vibration damper for a rotating shaft comprising a member secured to said shaft for rotation therewith, a weight, means operatively connecting said weight with said member, a piece carried by said member between two of the tracks in the member and having resilient blades extending across the ends of the tracks engaging the ends of said rollers for resiliently resisting movement of said rollers longitudinally of the shaft, and a piece carried by said weight between the corresponding tracks in the weight and having resilient blades extending across the ends of the tracks engaging the ends of said rollers for resiliently resisting movement of the weight with respect to the rollers longitudinally of the shaft.

8. In a damper as claimed in claim 7, said blades offering substantially less resistance to movement circumferentially of the shaft then to movement longitudinally of the shaft.

9. In a damper as claimed in claim 7, said rollers being longer than the tracks, the parts of said blades engaging the rollers being spaced from the member and weight, and means extending around the ends of the member and weight connecting the free ends of said blades.

10. In a damper as claimed in claim 7, a closed envelope rigid with said member and enclosing said tracks, weight and pieces, and a quantity of lubricant within said envelope sufficient, when the shaft rotates, to cover said tracks but insufficient to cover said weight.

11. A vibration damper for a rotating shaft comprising a member secured to the shaft for rotation therewith, a plurality of weights, means evenly distributed around the shaft mounting said weights on said member for movement with respect thereto in a plane transverse to the shaft axis, said means including sets of tracks in each weight and corresponding tracks in said member, rollers engaged in said tracks to guide said weights so that their centers of gravity move in curves eccentric to the shaft axis, spring means carried by said member resiliently resisting movement of said rollers longitudinally of the shaft, spring means carried by said weights resiliently resisting movement of the weights with respect to the rollers longitudinally of the shaft, and means engaging the sides of said weights nearest the shaft axis resiliently resisting movement of said weights circumferentially and radially of the shaft, said means offering substantially less resistance to movement circumferentially of the shaft than to movement radially of the shaft.

12. A vibration damper for a rotating shaft comprising a member secured to the shaft for rotation therewith, a plurality of weights, means evenly distributed around the shaft mounting said weights on said member for movement with respect thereto in a plane transverse to the shaft axis, said means including sets of tracks in each weight and corresponding tracks in said member, rollers engaged in said tracks to guide said weights so that their centers of gravity move in curves eccentric to the shaft axis, spring means carried by said member resiliently resisting movement of said rollers longitudinally of the shaft, spring means carried by said weights resiliently resisting movement of the weights with respect to the rollers longitudinally of the shaft, and a floating spring member engaging the sides of said weights nearest the shaft axis.

13. A vibration damper for a rotating shaft comprising a member secured to the shaft for rotation therewith, a plurality of weights, means evenly distributed around the shaft mounting said weights on said member for movement with respect thereto in a plane transverse to the shaft axis, said means including sets of tracks in each weight and corresponding tracks in said member, rollers engaged in said tracks to guide said weights so that their centers of gravity move in curves eccentric to the shaft axis, a piece carried by each weight having resilient blades extending across the ends of the tracks engaging the ends of said rollers for resiliently resisting movement of the weight with respect to the rollers longitudinally of the shaft, pieces carried by said member each having resilient blades extending across the ends of the tracks corresponding to one of said weights and engaging the ends of the rollers for resiliently resisting movement of said rollers longitudinally of the shaft, and a flat spring in the form of a closed ring engaging the sides of said weights nearest the shaft axis, said ring floating with respect to the shaft.

GILLES FRANÇOIS SARAZIN.

References Cited in the file of this patent

UNITED STATES PATENTS

| Number | Name | Date |
| --- | --- | --- |
| 1,718,207 | Anibal | June 25, 1929 |
| 2,079,226 | Sarazin | May 4, 1937 |
| 2,198,135 | Strasburg et al. | Apr. 23, 1940 |
| 2,346,972 | Kishline | Apr. 18, 1944 |

FOREIGN PATENTS

| Number | Country | Date |
| --- | --- | --- |
| 337,466 | Great Britain | Nov. 3, 1930 |